US012794351B2

(12) United States Patent
Zhang

(10) Patent No.: US 12,794,351 B2
(45) Date of Patent: Nov. 10, 2026

(54) POWER SUPPLY DEVICE INCLUDING A PLURALITY OF SEMICONDUCTOR SWITCHES CONNECTED IN SERIES

(71) Applicant: TMEIC CORPORATION, Tokyo (JP)

(72) Inventor: Xiaochen Zhang, Chuo-ku (JP)

(73) Assignee: TMEIC Corporation, Tokyo (JP)

( * ) Notice: Subject to any disclaimer, the term of this patent is extended or adjusted under 35 U.S.C. 154(b) by 93 days.

(21) Appl. No.: 18/708,510

(22) PCT Filed: Oct. 6, 2022

(86) PCT No.: PCT/JP2022/037404

§ 371 (c)(1),
(2) Date: May 8, 2024

(87) PCT Pub. No.: WO2024/075236

PCT Pub. Date: Apr. 11, 2024

(65) Prior Publication Data

US 2025/0023453 A1 Jan. 16, 2025

(51) Int. Cl.
*H02M 7/797* (2006.01)
*H02H 3/05* (2006.01)
(Continued)

(52) U.S. Cl.
CPC ................ *H02M 1/32* (2013.01); *H02H 3/05* (2013.01); *H02H 7/1203* (2013.01); *H02M 1/092* (2013.01); *H02M 7/797* (2013.01)

(58) Field of Classification Search
CPC ..... G05F 1/00; G05F 1/10; G05F 1/12; G05F 1/46; G05F 1/45; G05F 1/445; G05F 1/66;
(Continued)

(56) References Cited

U.S. PATENT DOCUMENTS 5,528,446 A * 6/1996 Sankaran ................ H02M 1/32 361/25
8,854,848 B1 * 10/2014 Chen ..................... H02M 3/285 323/283
(Continued)

FOREIGN PATENT DOCUMENTS

JP 2008-306285 A 12/2008
KR 10-2020-0106205 A 9/2020

OTHER PUBLICATIONS

International Search Report Issued Dec. 20, 2022, in PCT/JP2022/037404, filed on Oct. 6, 2022, therein, 2 pages.
(Continued)

*Primary Examiner* — Nusrat Quddus
(74) *Attorney, Agent, or Firm* — Knobbe, Martens, Olson & Bear, LLP

(57) ABSTRACT

A first communication line transmits a control signal from an I/F circuit to an n-th drive circuit. A second communication line transmits a state detection signal of semiconductor switches from the n-th drive circuit to the I/F circuit. An i-th drive circuit includes a driver for an i-th semiconductor switch, an abnormality detection circuit for detecting an abnormality of the i-th semiconductor switch, and first and second notification members. The abnormality detection circuit detects the abnormality of the i-th semiconductor switch and an operation state of the i-th semiconductor switch, and notifies a detection result using the first notification member. The abnormality detection circuit generates the state detection signal indicating an operation state of the i-th to n-th semiconductor switches, detects a mismatch between the control signal and the operation state of the i-th to n-th semiconductor switches, and notifies a detection result using the second notification member.

9 Claims, 9 Drawing Sheets

(51) Int. Cl.

| | |
|---|---|
| ***H02H 7/12*** | (2006.01) |
| ***H02M 1/092*** | (2006.01) |
| ***H02M 1/32*** | (2007.01) |

(58) Field of Classification Search

CPC ..... G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 1/32; H02M 2001/322; H02M 2001/327; H02M 1/34; H02M 2001/342; H02M 2001/344; H02M 2001/346; H02M 2001/348; H02M 1/36; H02M 1/38; H02M 1/42; H02M 1/4208; H02M 1/4216; H02M 1/4225; H02M 1/4233; H02M 1/4241; H02M 1/425; H02M 1/4258; H02M 2001/4275; H02M 2001/4283; H02M 2001/4291; H02M 5/2573; H02M 1/081; H02M 5/293; H02M 3/125; H02M 3/13; H02M 3/145; H02M 3/15; H02M 3/155; H02M 3/156; H02M 3/158; H02M 3/1588; H02M 2003/1566; H02M 3/1585; H02M 2003/1557; H05B 39/048; B23K 11/24; H02H 7/261; H02H 7/268; H02H 7/122; H02H 7/1222; H02H 7/1225; H02H 7/1227; H02H 7/125; H02H 7/1252; H02H 7/1255; H02H 7/1257; H02H 3/00; H02H 3/02; H02H 3/05; H02J 3/36; H02J 3/01; H02J 9/00; H02J 9/04; H02J 9/06; H02J 9/062; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17; H03K 17/08; H01H 9/54; H01H 9/541; H01H 9/542; H01H 9/547; H01H 9/548

See application file for complete search history.

(56) References Cited

U.S. PATENT DOCUMENTS

| | | | | |
|---|---|---|---|---|
| 9,685,589 | B2 * | 6/2017 | Bergbauer | H10H 20/8252 |
| 2002/0057540 | A1 * | 5/2002 | Ito | H03K 17/105 361/18 |
| 2007/0159749 | A1 * | 7/2007 | Oka | H02M 7/487 361/93.1 |
| 2015/0022928 | A1 * | 1/2015 | Mohaddes Khorassani | H02H 3/08 361/93.7 |
| 2015/0055261 | A1 * | 2/2015 | Lubicki | H02H 1/06 361/91.1 |
| 2015/0155711 | A1 * | 6/2015 | Kanayama | H02J 9/062 307/80 |
| 2016/0247641 | A1 * | 8/2016 | Malapelle | H02M 7/003 |
| 2017/0244241 | A1 * | 8/2017 | Wilson | H02H 9/025 |
| 2020/0280313 | A1 * | 9/2020 | Rinne | H02M 3/33576 |
| 2021/0057997 | A1 * | 2/2021 | Zhang | H02M 1/08 |
| 2022/0320893 | A1 * | 10/2022 | Hattori | H02M 1/32 |

OTHER PUBLICATIONS

Darbas et al., "Cascaded Smart Gate Drivers for Modular Multilevel Converters Control: A Decentralized Voltage Balancing Algorithm." Energies, 2021, 14, 3589, pp. 1-27.

Office Action issued in Indian Application No. 202417035350, dated Jun. 25, 2026.

* cited by examiner

POWER SUPPLY DEVICE INCLUDING A PLURALITY OF SEMICONDUCTOR SWITCHES CONNECTED IN SERIES

TECHNICAL FIELD

The present disclosure relates to a power supply device, and in particular to a power supply device including a plurality of semiconductor switches connected in series.

BACKGROUND ART

For example, Japanese Patent Laying-Open No. 2008-306285 (PTL 1) discloses a control device for a semiconductor switch, configured to detect an abnormality of the semiconductor switch used for a power conversion device. The control device includes a control circuit that provides a drive signal to a semiconductor switch element, an insulation circuit that optically insulates the drive signal and transmits it to a high-voltage circuit, and a drive circuit that generates a gate voltage of the semiconductor switch element based on the drive signal. The semiconductor switch element is turned on or off in response to the drive signal.

The control device further includes a gate voltage detection circuit that distinguishes whether the semiconductor switch element is in an ON state or is in an OFF state based on the gate voltage outputted from the drive circuit, a signal insulation circuit that optically insulates a gate voltage state signal of the semiconductor switch element and transmits it to a low-voltage circuit, and an abnormality detection circuit that detects an abnormality of the semiconductor switch element based on the transmitted gate voltage state signal. The abnormality detection circuit is configured such that, when it detects an abnormality of the semiconductor switch element, it cuts off the semiconductor switch element by feeding back an abnormality signal to the control circuit.

CITATION LIST

Patent Literature

PTL 1: Japanese Patent Laying-Open No. 2008-306285

SUMMARY OF INVENTION

Technical Problem

When the control device described above is applied in a power supply device including a plurality of semiconductor switches connected in series in order to detect an abnormality of each semiconductor switch, it is necessary to provide wiring for connecting the control circuit, the insulation circuit, and the drive circuit, for each semiconductor switch. Further, it is necessary to provide wiring for connecting the gate voltage detection circuit, the signal insulation circuit, and the abnormality detection circuit, for each semiconductor switch. Accordingly, there is a concern that the power supply device may have a complicated device configuration.

Further, in the control device described above, the abnormality detection circuit is configured to distinguish whether the semiconductor switch element is normal or abnormal, by comparing the drive signal with the gate voltage state signal transmitted from the gate voltage detection circuit. Thus, when an abnormality of the semiconductor switch element is detected, it is not possible to distinguish whether the abnormality occurs in the drive circuit, or the abnormality occurs in the insulation circuit that transmits the drive signal and the gate voltage state signal. Accordingly, when the control device described above is applied to a power supply device including a plurality of semiconductor switches, there is a concern that it may be difficult to specify the content and the site of occurrence of the abnormality.

The present disclosure has been made to solve the aforementioned problem, and an object of the present disclosure is to make it possible to specify the content and the site of occurrence of an abnormality in a power supply device including a plurality of semiconductor switches connected in series, without complicating the configuration of the device.

Solution to Problem

A power supply device in accordance with one aspect of the present disclosure includes, when n is an integer more than or equal to 2 and i is an integer that is more than or equal to 1 and less than or equal to n−1: first to n-th semiconductor switches connected in series between first and second terminals; first to n-th drive circuits; an interface circuit; and first and second communication lines. The first to n-th drive circuits are provided corresponding to the first to n-th semiconductor switches, respectively, and drive the corresponding semiconductor switches in response to a control signal. The interface circuit transmits and receives signals to and from the first to n-th drive circuits. The first and second communication lines connect the interface circuit and the first to n-th drive circuits in series. The first communication line is configured to sequentially transmit the control signal from the interface circuit to the n-th drive circuit via the first drive circuit. The second communication line is configured to sequentially transmit a state detection signal indicating an operation state of the semiconductor switches, from the n-th drive circuit to the interface circuit via the first drive circuit. An i-th drive circuit includes a driver that drives an i-th semiconductor switch in response to the control signal received from an (i−1)-th drive circuit, an abnormality detection circuit for detecting an abnormality of the i-th semiconductor switch, and first and second notification members. The abnormality detection circuit detects the abnormality of the i-th semiconductor switch based on the control signal and an operation state of the i-th semiconductor switch, and notifies a detection result using the first notification member. The abnormality detection circuit generates the state detection signal indicating an operation state of the i-th to n-th semiconductor switches based on the operation state of the i-th semiconductor switch and the state detection signal indicating an operation state of (i+1)-th to the n-th semiconductor switches received from an (i+1)-th drive circuit.

The abnormality detection circuit detects a mismatch between the control signal and the operation state of the i-th to n-th semiconductor switches based on the control signal and the generated state detection signal, and notifies a detection result using the second notification member.

Advantageous Effects of Invention

According to the present disclosure, it is possible to specify the content and the site of occurrence of an abnormality that occurs in a power supply device including a plurality of semiconductor switches connected in series, without complicating the configuration of the device.

DESCRIPTION OF EMBODIMENTS

Figure 1:
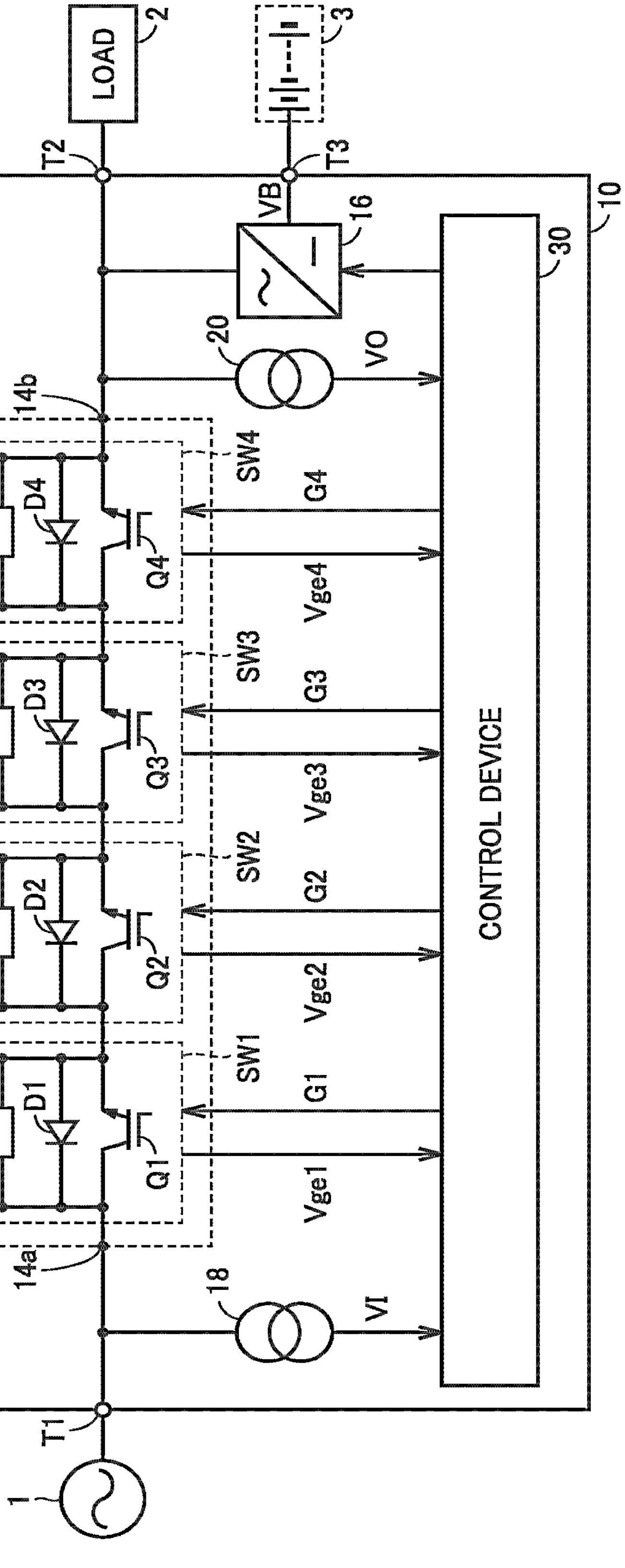
FIG. 1 is a view showing a schematic configuration of a power supply device in accordance with an embodiment.

Hereinafter, an embodiment of the present disclosure will be described in detail with reference to the drawings. It should be noted that, in the following, identical or corresponding parts in the drawings will be designated by the same reference numerals, and the description thereof will not be repeated in principle.

<Configuration of Power Supply Device>

FIG. 1 is a view showing a schematic configuration of a power supply device in accordance with an embodiment.

As shown in FIG. 1, a power supply device 10 in accordance with the embodiment is connected between an alternating current (AC) power supply 1 and a load 2, and is configured to receive AC power from AC power supply 1 and supply the AC power to load 2. Power supply device 10 is applicable, for example, to a multiple power compensator, which is a device for uninterruptedly supplying stable AC power to load 2 when a power failure or an instantaneous voltage drop occurs in AC power supply 1.

AC power supply 1 is typically a commercial AC power supply, and supplies AC power having a commercial frequency to power supply device 10. Load 2 is driven by the AC power having the commercial frequency supplied from power supply device 10. It should be noted that, although FIG. 1 shows only a portion related to one-phase AC power, power supply device 10 may receive three-phase AC power and output the three-phase AC power.

Power supply device 10 includes an input terminal T1, an output terminal T2, a direct current (DC) terminal T3, a switch circuit 14, a bidirectional converter 16, voltage detectors 18 and 20, and a control device 30.

Input terminal T1 is electrically connected to AC power supply 1, and receives an AC voltage V1 having the commercial frequency supplied from AC power supply 1. Input terminal T1 corresponds to one embodiment of a "first terminal". Output terminal T2 is connected to load 2. Load 2 is driven by an AC voltage VO supplied from output terminal T2. Output terminal T2 corresponds to one embodiment of a "second terminal".

DC terminal T3 is connected to a battery 3. Battery 3 corresponds to one embodiment of a "power storage device" for storing DC power. Instead of battery 3, an electric double layer capacitor may be connected to DC terminal T3, as a power storage device. An instantaneous value of a DC voltage VB of DC terminal T3 (a terminal-to-terminal voltage of battery 3) is detected by control device 30.

Switch circuit 14 has an input node 14*a*, an output node 14*b*, and *n* semiconductor switches SW1 to SWn (n is an integer more than or equal to 2). Input node 14*a* is connected to input terminal T1, and output node 14*b* is connected to output terminal T2. In the example of FIG. 1, n is 4. However, number n of the semiconductor switches is not limited to 4.

Turning on/off of semiconductor switches SW1 to SWn is controlled by gate signals G1 to Gn, respectively, inputted from control device 30. In the following, when semiconductor switches SW1 to SWn are collectively described, they will also be simply referred to as "semiconductor switches SW". When gate signals G1 to Gn are collectively described, they will also be simply referred to as "gate signals G".

A semiconductor switch SWi (i is an integer that is more than or equal to 1 and less than or equal to n) has an IGBT (Insulated Gate Bipolar Transistor) Qi, a diode Di connected in anti-parallel with IGBT Qi, a snubber circuit SNi, and a varistor Zi. IGBT Qi has a collector electrically connected to input node 14*a*, and an emitter electrically connected to output node 14*b*. IGBT Qi is turned on (conducted) by a gate signal Qi at an H (logic high) level, and is turned off (cut off) by gate signal Qi at an L (logic low) level. Diode Di is connected, with a direction directed from output node 14*b* to input node 14*a* being defined as a forward direction. It should be noted that, for semiconductor switch SWi, any self-arc-extinguishing semiconductor switching element can be used instead of an IGBT.

Snubber circuit SNi is connected in parallel with IGBT Qi to protect IGBT Qi from a surge voltage. Snubber circuit SNi has, for example, a resistive element and a capacitor connected in series between the collector and the emitter of IGBT Qi. When IGBT Qi is turned off suddenly while a current is flowing through IGBT Qi, a surge voltage is generated between the collector and the emitter of IGBT Qi due to self-inductance. Snubber circuit SNi protects IGBT Qi by suppressing such a surge voltage.

Varistor Zi is connected in parallel with IGBT Qi. Varistor Zi is a resistor whose resistance value has voltage dependency. Varistor Zi is a ZnR (Zinc oxide nonlinear resistor), for example. The resistance value of varistor Zi changes according to a terminal-to-terminal voltage thereof, and decreases suddenly when the terminal-to-terminal voltage exceeds a threshold voltage. Therefore, varistor Zi can suppress a voltage between the collector and the emitter of IGBT Qi from exceeding the threshold voltage, and resultantly prevent IGBT Qi from being damaged by a surge voltage.

In the following, when IGBTs Q1 to Qn are collectively described, they will also be simply referred to as "IGBTs Q". When snubber circuits SN1 to SNn are collectively described, they will also be simply referred to as "snubber circuits SN". When varistors Z1 to Zn are collectively described, they will also be simply referred to as "varistors Z".

Figure 2:
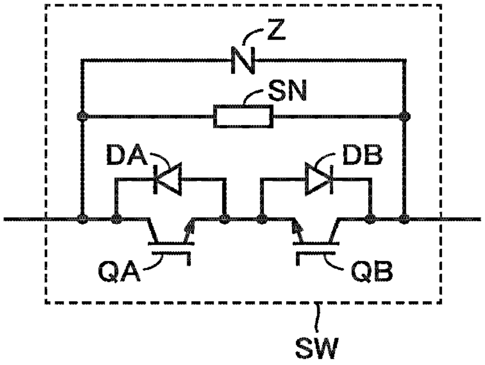
FIG. 2 is a circuit diagram showing another configuration example of semiconductor switches shown in FIG. 1.

It should be noted that semiconductor switches SW are not limited to have the configuration of FIG. 1, and can also have a configuration shown in FIG. 2, for example. In the example of FIG. 2, semiconductor switch SW has IGBTs QA and QB connected in anti-series with each other, diodes DA and DB connected in anti-parallel with IGBTs QA and QB, respectively, snubber circuit SN, and varistor Z. IGBT QA has a collector electrically connected to input node 14*a*, and an emitter connected to an emitter of IGBT QB. IGBT QB has a collector electrically connected to output node 14*b*. Diode DA is connected, with a direction directed from output node 14*b* to input node 14*a* being defined as a forward direction. Diode DB is connected, with a direction directed from input node 14*a* to output node 14*b* being defined as a forward direction. Snubber circuit SN and varistor Z are connected in parallel with a series circuit of IGBTs QA and QB.

Referring back to FIG. 1, bidirectional converter 16 is connected between output node 14*b* of switch circuit 14 and DC terminal T3. Bidirectional converter 16 is configured to execute bidirectional power conversion between AC power outputted to output node 14*b* and DC power stored in battery 3.

During a normal state in which the AC power is supplied from AC power supply 1, bidirectional converter 16 converts the AC power supplied from AC power supply 1 via switch circuit 14 into DC power and stores the DC power in battery 3. On the other hand, when there occurs a power failure in which the supply of the AC power from AC power supply 1 is stopped, or when there occurs an instantaneous voltage drop in AC power supply 1, bidirectional converter 16 converts the DC power in battery 3 into AC power having the commercial frequency and supplies the AC power to load 2.

Bidirectional converter 16 has a plurality of semiconductor switching elements, although not shown. Turning on/off of the plurality of semiconductor switching elements is controlled by a control signal generated by control device 30. Bidirectional converter 16 can execute bidirectional power conversion between the AC power outputted to output node 14*b* and the DC power inputted/outputted to/from DC terminal T3, by turning on or off the plurality of semiconductor switching elements in response to the control signal.

Voltage detector 18 detects an instantaneous value of AC voltage VI supplied from AC power supply 1 to input terminal T1, and provides a signal indicating a detection value thereof to control device 30. Control device 30 determines whether or not AC power supply 1 is normal, based on the instantaneous value of AC voltage VI. For example, when AC voltage VI is higher than a predetermined lower limit voltage, control device 30 determines that AC power supply 1 is normal. When AC voltage VI is lower than the lower limit voltage, control device 30 determines that AC power supply 1 is abnormal.

Voltage detector 20 detects an instantaneous value of AC voltage VO appearing at output terminal T2, and provides a signal indicating a detection value thereof to control device 30.

Semiconductor switch SWi provides a signal Vgei indicating the magnitude of a voltage Vge between a gate and the emitter of IGBT Qi to control device 30. In the following description, voltage Vge between the gate and the emitter will also be referred to as a "gate voltage Vge". As described later, gate voltage Vge is set to a voltage higher than a threshold voltage Vth of IGBT Q when IGBT Q is in an ON state, and is set to a voltage lower than threshold voltage Vth when IGBT Q is in an OFF state. Therefore, it can be determined from the magnitude of gate voltage Vge whether IGBT Q is in the ON state or is in the OFF state.

Control device 30 controls operation of switch circuit 14 and bidirectional converter 16, using a command from a higher-order controller not shown, signals inputted from voltage detectors 18 and 20, signals inputted from switch circuit 14, and the like. Control device 30 can be configured, for example, by a microcomputer or the like. As an example, control device 30 has a CPU (Central Processing Unit) and a memory not shown, and can execute control operation described below by software processing performed by the CPU executing a program stored in the memory. Alternatively, the control operation can be partly or entirely implemented by hardware processing using a dedicated embedded electronic circuit and the like, instead of software processing.

<Operation of Power Supply Device 10>

Next, operation of power supply device 10 in accordance with the embodiment will be described.

When AC power supply 1 is normal, control device 30 provides gate signals G1 to Gn at the H level to semiconductor switches SW1 to SWn, respectively, of switch circuit 14. Since semiconductor switches SW1 to SWn are turned on, the AC power is supplied from AC power supply 1 to load 2 via switch circuit 14, and load 2 is driven. Further, the AC power is supplied from AC power supply 1 to bidirectional converter 16 via switch circuit 14, and the AC power is converted into DC power and is stored in battery 3. On this occasion, control device 30 controls bidirectional converter 16 such that terminal-to-terminal voltage VB of battery 3 is set to a reference voltage VBr.

When AC power supply 1 is abnormal (when a power failure or an instantaneous voltage drop occurs in AC power supply 1), control device 30 provides gate signals G1 to Gn at the L level to semiconductor switches SW1 to SWn, respectively. Semiconductor switches SW1 to SWn are turned off instantaneously, and the DC power in battery 3 is converted into AC power by bidirectional converter 16 and the AC power is supplied to load 2. Therefore, even when an abnormality occurs in AC power supply 1, operation of load 2 can be continued for a period in which the DC power is stored in battery 3. On this occasion, control device 30 controls bidirectional converter 16 based on AC voltage VO detected by voltage detector 20, such that AC voltage VO is set to a reference voltage VOr. When terminal-to-terminal voltage VB of battery 3 decreases and reaches a predetermined lower limit voltage, control device 30 stops operation of bidirectional converter 16.

When an abnormality occurs in any of semiconductor switches SW1 to SWn constituting switch circuit 14 during execution of the operation described above, it becomes impossible to operate switch circuit 14 normally. Accordingly, it becomes difficult for power supply device 10 to stably supply the power to load 2.

For example, when a failure in which IGBT Q is not turned on normally occurs in any semiconductor switch SW, it becomes impossible to supply the AC power from AC power supply 1 to load 2 via switch circuit 14. In this case, it is possible to turn off all of remaining semiconductor switches SW and supply the DC power in battery 3 to load 2 via bidirectional converter 16, according to the operation performed when AC power supply 1 is abnormal. However, there is a limit in the power that can be supplied from battery 3.

Alternatively, when a failure in which IGBT Q is not turned off normally occurs in any semiconductor switch SW, that semiconductor switch SW is maintained in an ON state when AC power supply 1 is abnormal. Thus, a voltage difference between input node 14*a* and output node 14*b* may be intensively applied to between terminals of remaining semiconductor switches SW in an OFF state, and remaining semiconductor switches SW may fall into an overvoltage state.

In order to avoid such a defect, control device 30 is configured to detect an abnormality in switch circuit 14 during the operation of power supply device 10. When detecting an abnormality in switch circuit 14, control device 30 notifies a user of power supply device 10 about the abnormality in switch circuit 14, by turning on warning lights mounted in control device 30.

<Configuration of Control Device 30>

Figure 3:
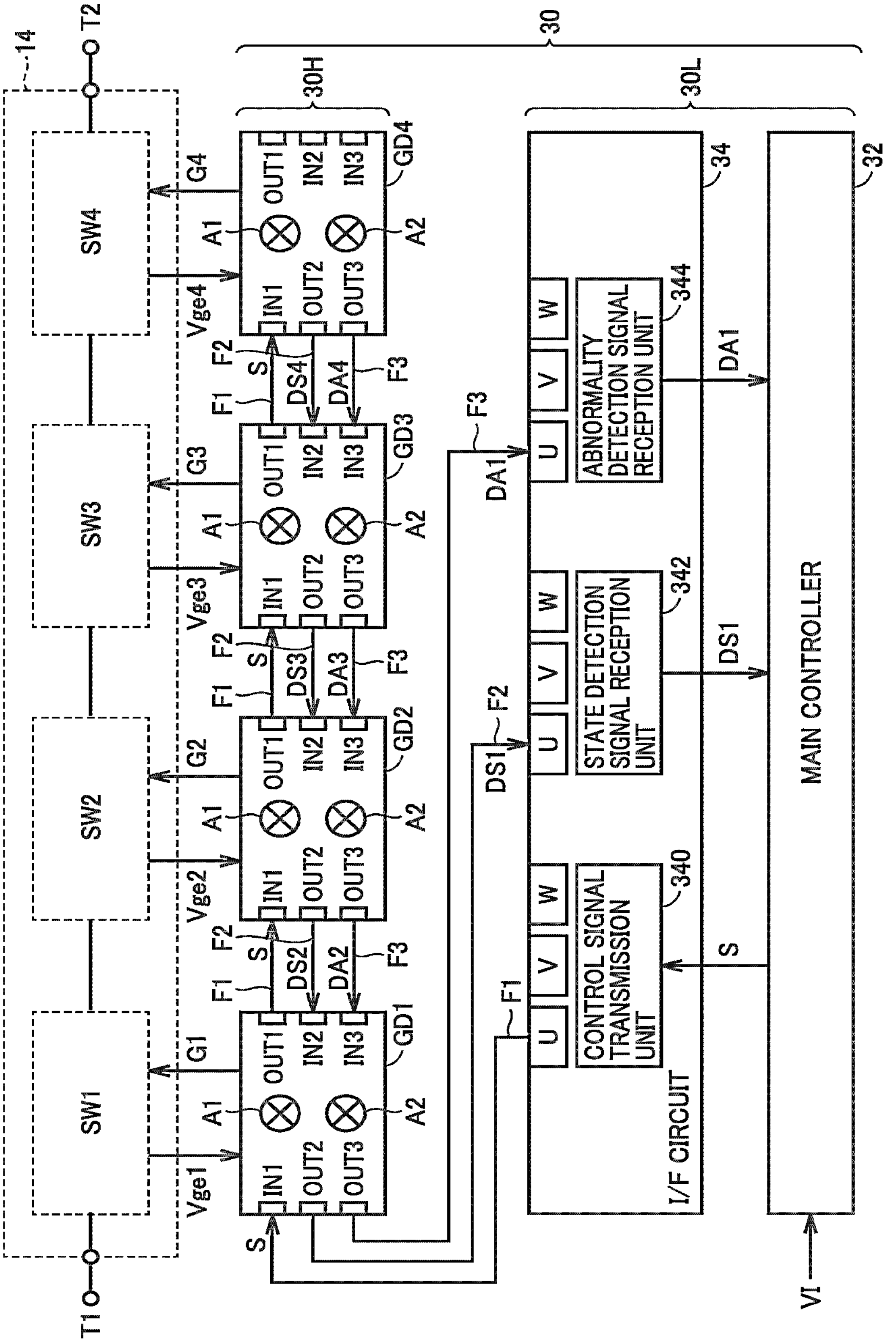
FIG. 3 is a circuit block diagram showing a configuration of a portion related to control of a switch circuit, of a control device.

FIG. 3 is a circuit block diagram showing a configuration of a portion related to control of switch circuit 14, of control device 30. It should be noted that FIG. 3 shows only a portion related to one-phase (U-phase) AC power.

As shown in FIG. 3, control device 30 includes a main controller 32, an interface (I/F) circuit 34, n gate drivers GD1 to GDn, and optical fibers F1 to F3.

(Main Controller 32)

Main controller 32 determines whether or not AC power supply 1 is normal, based on the instantaneous value of AC voltage VI detected by voltage detector 18. Main controller 32 generates a control signal S for controlling turning on/off of semiconductor switches SW1 to SWn based on a determination result. Specifically, when AC voltage VI is higher than the lower limit voltage, main controller 32 determines that AC power supply 1 is normal. In this case, main controller 32 generates control signal S at an H level and outputs it to I/F circuit 34. As described later, gate drivers GD1 to GDn generate gate signals G1 to Gn at the H level, respectively, in response to control signal S at the H level. That is, control signal S at the H level corresponds to an ON command for turning on semiconductor switches SW (a conduction command).

On the other hand, when AC voltage VI is lower than the lower limit voltage, main controller 32 determines that AC power supply 1 is abnormal. In this case, main controller 32 generates control signal S at an L level and outputs it to I/F circuit 34. As described later, gate drivers GD1 to GDn generate gate signals G1 to Gn at the L level, respectively, in response to control signal S at the L level. That is, control signal S at the L level corresponds to an OFF command for turning off semiconductor switches SW (a cut-off command).

(I/F Circuit 34)

I/F circuit 34 is an input/output device for exchanging signals with main controller 32 and gate drivers GD1 to GDn. I/F circuit 34 receives control signal S from main controller 32. I/F circuit 34 includes a control signal transmission unit 340. Control signal transmission unit 340 converts control signal S as an electrical signal into an optical signal, and outputs it to optical fiber F1. Control signal S is provided to gate driver GD1 via optical fiber F1.

I/F circuit 34 further includes a state detection signal reception unit 342 and an abnormality detection signal reception unit 344. State detection signal reception unit 342 receives a state detection signal DS1 from gate driver GD1 via optical fiber F2.

A state detection signal DSi (i is an integer that is more than or equal to 1 and less than or equal to n) is a signal indicating an operation state of IGBTs Qi to Qn included in semiconductor switches SWi to SWn, respectively (whether they are in the ON state or the OFF state). When all of IGBTs Qi to Qn are in the ON state, state detection signal DSi is set to an H level. When at least one of IGBTs Qi to Qn is in the OFF state, state detection signal DSi is set to an L level. It should be noted that a state detection signal DSn is set to the H level when IGBT Qn is in the ON state, and is set to the L level when IGBT Qn is in the OFF state. State detection signal reception unit 342 converts state detection signal DS1 as an optical signal into an electrical signal, and outputs it to main controller 32.

Abnormality detection signal reception unit 344 receives an abnormality detection signal DA1 from gate driver GD1 via optical fiber F3. An abnormality detection signal DAi (i is an integer that is more than or equal to 1 and less than or equal to n) is a signal indicating the presence or absence of an abnormality in semiconductor switches SWi to SWn. When an abnormality occurs in semiconductor switches SWi to SWn, abnormality detection signal DAi is set to an L level. When no abnormality occurs in semiconductor switches SWi to SWn, abnormality detection signal DAi is set to an H level. It should be noted that an abnormality detection signal DAn is set to the L level when an abnormality occurs in semiconductor switch SWn, and is set to the H level when no abnormality occurs in semiconductor switch SWn. Abnormality detection signal reception unit 344 converts abnormality detection signal DA1 as an optical signal into an electrical signal, and outputs it to main controller 32.

(Gate Drivers GD1 to GDn)

Gate drivers GD1 to GDn are provided corresponding to semiconductor switches SW1 to SWn, respectively. In the following, when gate drivers GD1 to GDn are collectively described, they will also be simply referred to as “gate drivers GD”. Gate driver GD has input terminals IN1 to IN3, output terminals OUT1 to OUT3, and warning lights A1 and A2. Gate driver GD corresponds to one embodiment of a “drive circuit”.

Input terminal IN1 is a terminal for receiving control signal S. Output terminal OUT1 is a terminal for transferring control signal S to another gate driver GD.

Input terminal IN2 is a terminal for receiving a state detection signal DS from another gate driver GD. Output terminal OUT2 is a terminal for transferring state detection signal DS to another gate driver GD.

Input terminal IN3 is a terminal for receiving an abnormality detection signal DA from another gate driver GD. Output terminal OUT3 is a terminal for transferring abnormality detection signal DA to another gate driver GD.

In a gate driver GDj (j is an integer that is more than or equal to 2 and less than or equal to n−1), input terminal IN1 is connected to output terminal OUT1 of a gate driver GDj−1 by optical fiber F1. Input terminal IN2 is connected to output terminal OUT2 of a gate driver GDj+1 by optical fiber F2. Input terminal IN3 is connected to output terminal OUT3 of gate driver GDj+1 by optical fiber F3.

In gate driver GD1, input terminal IN1 is connected to control signal transmission unit 340 of I/F circuit 34 by optical fiber F1. Input terminal IN2 is connected to output terminal OUT2 of a gate driver GD2 by optical fiber F2. Input terminal IN3 is connected to output terminal OUT3 of gate driver GD2 by optical fiber F3. Output terminal OUT2 is connected to state detection signal reception unit 342 of I/F circuit 34 by optical fiber F2. Output terminal OUT3 is connected to abnormality detection signal reception unit 344 by optical fiber F3.

In gate driver GDn (GD4 in FIG. 3), input terminal IN1 is connected to output terminal OUT1 of gate driver GDn □1 (GD3 in FIG. 3) by optical fiber F1. Output terminal [OU1] OUT1 and input terminals IN1 and IN2 are unconnected.

Gate driver GD is provided with warning lights A1 and A2. Warning lights A1 and A2 are notification members for notifying the user of power supply device 10 about an abnormality that occurs in semiconductor switch SW. Warning light A1 is turned on when it is impossible to turn on or off semiconductor switch SW in response to control signal S, due to a failure of IGBT Q or a failure of a driver that drives IGBT Q, as described later.

Warning light A2 is turned on when a failure of communication of control signal S or state detection signal DS occurs due to a damage to optical fiber F1 or F2, or the like, as described later.

(Optical Fibers F1 to F3)

As shown in FIG. 3, I/F circuit 34 and gate drivers GD1 to GDn are connected in series by optical fibers F1 to F3. Optical fiber F1 is a signal line for transmitting control signal S from I/F circuit 34 to gate drivers GD1 to GDn. Control signal S outputted from I/F circuit 34 is transmitted to gate drivers GD1, GD2, . . . , and GDn in order via optical fiber F1. Optical fiber F1 corresponds to one embodiment of "a first communication line".

Optical fiber F2 is a signal line for transmitting state detection signal DS from gate drivers GD1 to GDn to I/F circuit 34. State detection signal DS outputted from gate driver GDn is transmitted to gate drivers GDn−1, GDn−2, . . . , and GD1 in order via optical fiber F2, and is transmitted from gate driver GD1 to I/F circuit 34 via optical fiber F2. It should be noted that gate driver GDj is configured to generate a state detection signal DSj based on a state detection signal DSj+1 inputted to input terminal IN2 and an operation state of IGBT Q in corresponding semiconductor switch SW, and output generated state detection signal DSj from output terminal OUT2 to gate driver GDj−1. Optical fiber F2 corresponds to one embodiment of "a second communication line".

Optical fiber F3 is a signal line for transmitting abnormality detection signal DA from gate drivers GD1 to GDn to I/F circuit 34. Abnormality detection signal DA outputted from gate driver GDn is transmitted to gate drivers GDn−1, GDn−2, . . . , and GD1 in order via optical fiber F3, and is transmitted from gate driver GD1 to I/F circuit 34 via optical fiber F3. It should be noted that gate driver GDj is configured to generate an abnormality detection signal DAj based on an abnormality detection signal DAj+1 inputted to input terminal IN3 and an abnormality detection result in corresponding semiconductor switch SW, and output generated abnormality detection signal DAj from output terminal OUT3 to gate driver GDj−1. Optical fiber F3 corresponds to one embodiment of "a third communication line".

In the configuration shown in FIG. 3, main controller 32 and I/F circuit 34 are low-voltage components 30L operated by receiving a power supply voltage of about several volts. Gate drivers GD1 to GDn are high-voltage components 30H operated by receiving a power supply voltage of about several kilovolts. Electrical insulation between high-voltage components 30H and low-voltage components 30L can be secured by applying optical fibers F1 to F3 as the communication lines for exchanging the signals between I/F circuit 34 and gate driver GD1. It should be noted that, depending on the configuration of power supply device 10, optical fibers F1 to F3 that connect I/F circuit 34 and gate driver GD1 may have a wiring length of several meters.

Here, consideration is given to a configuration in which gate drivers GD1 to GDn are connected in parallel with one another with respect to I/F circuit 34, in contrast to FIG. 3. In such a configuration, optical fibers F1 to F3 are provided between each of gate drivers GD1 to GDn and I/F circuit 34. Thereby, each gate driver GD can directly exchange the signals with I/F circuit 34, and thereby delay of the signals is suppressed. On the other hand, since optical fibers F1 to F3 reaching several meters are connected to all of gate drivers GD1 to GDn, there is a concern that wiring may become complicated as number n of semiconductor switches SW increases.

In the present embodiment, the wiring length of optical fibers F1 to F3 connected to gate drivers GD2 to GDn can be shortened to about several tens of centimeters, by connecting gate drivers GD1 to GDn in series with respect to I/F circuit 34. Therefore, this suppresses wiring from becoming complicated due to an increase in number n of semiconductor switches SW.

<Configuration Example of Gate Drivers GD>

Next, a configuration example of gate drivers GD shown in FIG. 3 will be described.

Figure 4:
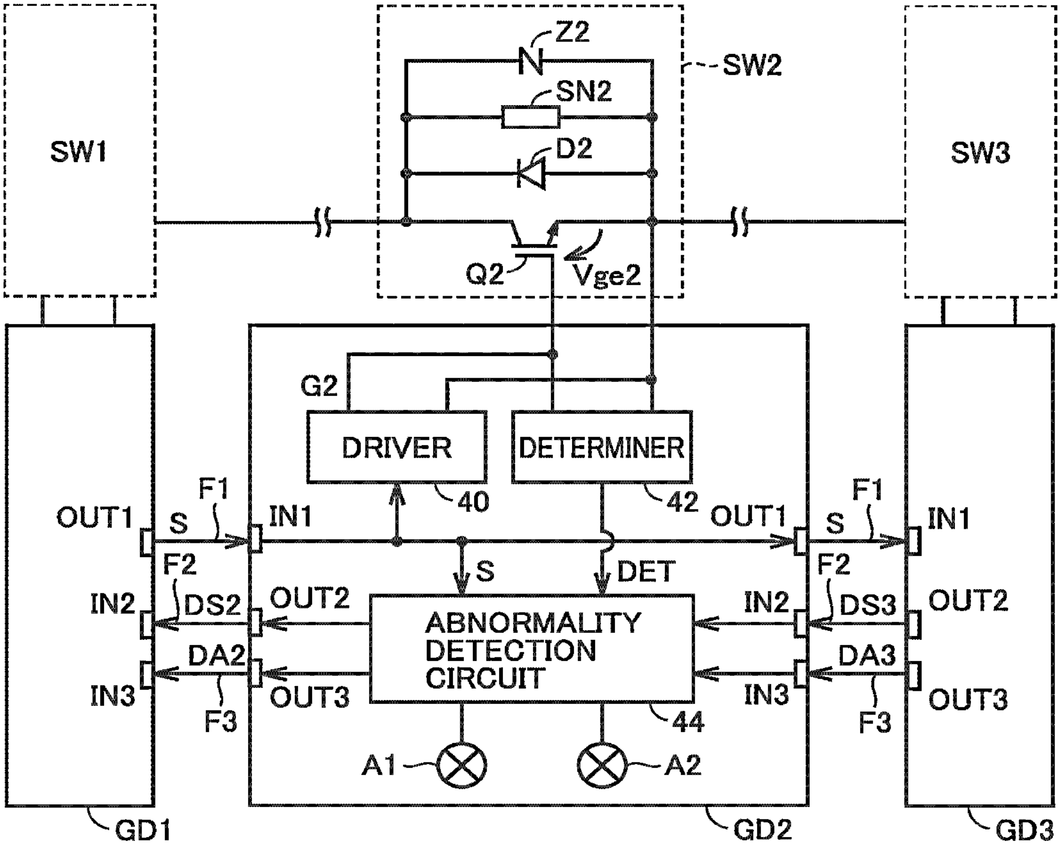
FIG. 4 is a circuit block diagram showing a configuration example of a gate driver.

FIG. 4 is a circuit block diagram showing a configuration example of gate driver GD. Since gate drivers GD1 to GDn have the same configuration, FIG. 4 illustrates the configuration of gate driver GD2 as a representative thereof.

As shown in FIG. 4, gate driver GD2 is provided corresponding to semiconductor switch SW2. Gate driver GD2 has a driver 40, a determiner 42, an abnormality detection circuit 44, and warning lights A1 and A2.

Input terminal IN1 receives control signal S from gate driver GD1. Control signal S is transferred to driver 40, abnormality detection circuit 44, and output terminal OUT1. Control signal S is provided from output terminal OUT1 to input terminal IN1 of gate driver GD3 via optical fiber F1.

Driver 40 generates gate signal G2 based on control signal S, and inputs generated gate signal G2 to the gate of IGBT Q2. Driver 40 generates gate signal G2 at the H level in response to control signal S at the H level (an ON command), and generates gate signal G2 at the L level in response to control signal S at the L level (an OFF command).

When gate signal G2 at the H level is inputted to the gate of IGBT Q2, a capacity between the gate and the emitter is charged, and thus gate voltage Vge gradually increases. When gate voltage Vge exceeds threshold voltage Vth, IGBT Q2 begins to be turned on. When IGBT Q2 begins to be turned on, gate voltage Vge increases to a gate drive voltage. When IGBT Q2 is in the ON state, gate voltage Vge is maintained at a constant voltage value.

When gate signal G2 at the L level is inputted to the gate of IGBT Q2, the capacity between the gate and the emitter is discharged, and thus gate voltage Vge gradually decreases from the gate drive voltage. When gate voltage Vge becomes lower than threshold voltage Vth, IGBT Q2 is turned off.

In this manner, gate voltage Vge is set to a voltage (gate drive voltage) higher than threshold voltage Vth when IGBT Q2 is in the ON state, and is set to a voltage lower than threshold voltage Vth when IGBT Q2 is in the OFF state.

Determiner 42 receives a signal Vge2 indicating the magnitude of gate voltage Vge of IGBT Q2 from semiconductor switch SW2. Determiner 42 determines whether IGBT Q2 is in the ON state or is in the OFF state based on signal Vge2, and outputs a signal DET indicating a determination result to abnormality detection circuit 44. Specifically, when gate voltage Vge is higher than threshold voltage Vth, it is determined that IGBT Q2 is in the ON state, and signal DET is set to an H level. On the other hand, when gate voltage Vge is lower than threshold voltage Vth, it is determined that IGBT Q2 is in the OFF state, and signal DET is set to an L level.

Input terminal IN2 receives a state detection signal DS3 from gate driver GD3. State detection signal DS3 is state detection signal DS generated in gate driver GD3, and is a signal indicating whether IGBTs Q3 to Qn included in semiconductor switches SW3 to SWn, respectively, are in the ON state or are in the OFF state. When all of IGBTs Q3 to Qn are in the ON state, state detection signal DS3 is set to the H level. When at least one of IGBTs Q3 to Qn is in the OFF state, state detection signal DS3 is set to the L level.

Input terminal IN2 receives a state detection signal DS3 from gate driver GD3. State detection signal DS3 is state detection signal DS generated in gate driver GD3, and is a signal indicating whether IGBTs Q3 to Qn included in semiconductor switches SW3 to SWn, respectively, are in the ON state or are in the OFF state. When all of GBTs Q3 to Qn are in the ON state, state detection signal DS3 is set to the H level. When at least one of IGBTs Q3 to Qn is in the OFF state, state detection signal DS3 is set to the L level.

Input terminal IN3 receives an abnormality detection signal DA3 from gate driver GD3. Abnormality detection signal DA3 is abnormality detection signal DA generated in gate driver GD3, and is a signal indicating the presence or absence of an abnormality in semiconductor switches SW3 to SWn. When an abnormality occurs in semiconductor switches SW3 to SWn, abnormality detection signal DA3 is set to the L level. When no abnormality occurs in semiconductor switches SW3 to SWn, abnormality detection signal DA3 is set to the H level. State detection signal DS3 and abnormality detection signal DA3 are transferred to abnormality detection circuit 44.

Abnormality detection circuit 44 generates a state detection signal DS2 and an abnormality detection signal DA2 based on control signal S, signal DET, state detection signal DS3, and abnormality detection signal DA3. State detection signal DS2 is provided from output terminal OUT2 to input terminal IN2 of gate driver GD1 via optical fiber F2. Abnormality detection signal DA2 is provided from output terminal OUT3 to input terminal IN3 of gate driver GD1 via optical fiber F3.

(Abnormality Detection Circuit 44)

Figure 5:
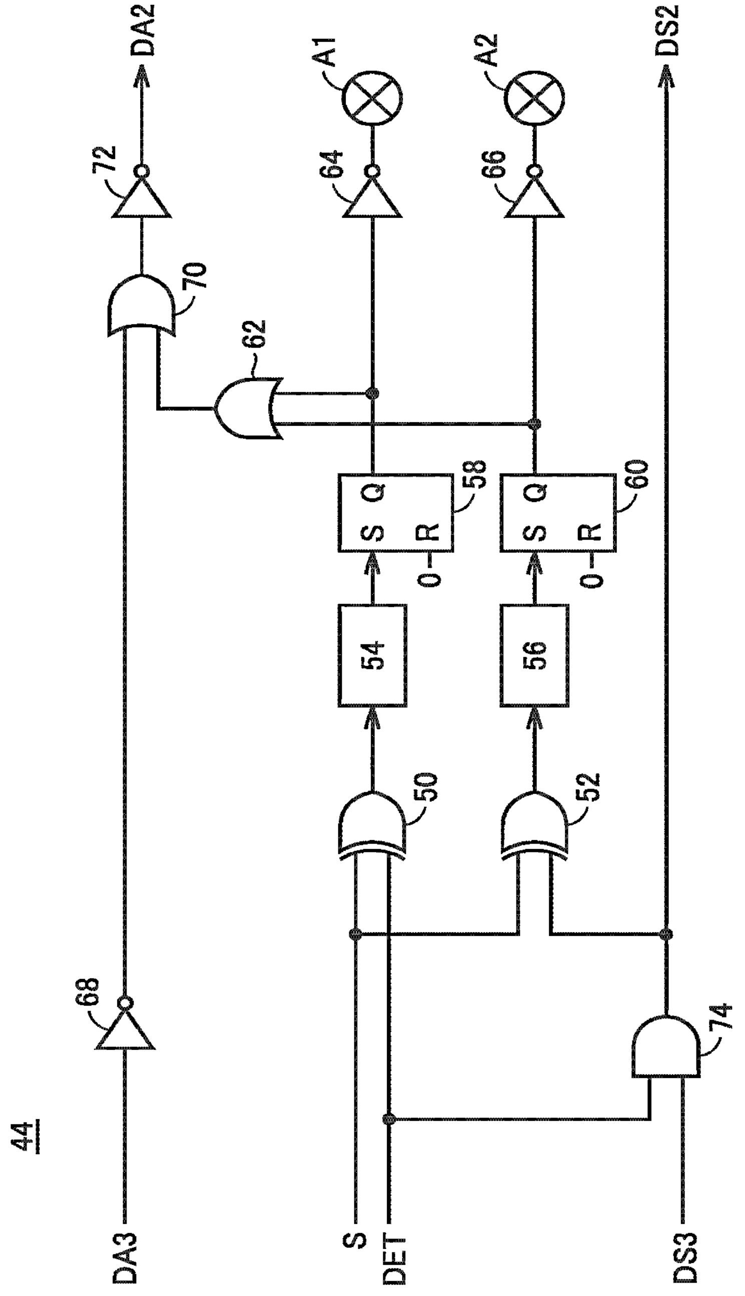
FIG. 5 is a circuit diagram showing a configuration example of an abnormality detection circuit shown in FIG. 4.

FIG. 5 is a circuit diagram showing a configuration example of abnormality detection circuit 44 shown in FIG. 4.

As shown in FIG. 5, abnormality detection circuit 44 is configured to include XOR (exclusive OR) circuits 50 and 52, timing circuits 54 and 56, flip-flops 58 and 60, logical sum (OR) circuits 62 and 70, negative (NOT) circuits 64, 66, 68, and 72, and a logical product (AND) circuit 74.

XOR circuit 50 receives control signal S at a first input terminal, and receives output signal DET of determiner 42 at a second input terminal. XOR circuit 50 calculates an exclusive OR of the two input signals, and outputs a signal indicating a calculation result. Specifically, when the value of control signal S matches the value of signal DET, XOR circuit 50 outputs a signal at an L level. When the value of control signal S does not match the value of signal DET, XOR circuit 50 outputs a signal at an H level.

Thereby, when both control signal S and signal DET are at the H level, that is, when IGBT Q2 of semiconductor switch SW2 is turned on normally in response to an ON command, the output signal of XOR circuit 50 is set to the L level. Alternatively, when both control signal S and signal DET are at the L level, that is, when IGBT Q2 is turned off normally in response to an OFF command, the output signal of XOR circuit 50 is set to the L level.

On the other hand, when control signal S is at the H level and signal DET is at the L level, that is, when IGBT Q2 is in the OFF state in spite of an ON command, or when control signal S is at the L level and signal DET is at the H level, that is, when IGBT Q2 is in the ON state in spite of an OFF command, the output signal of XOR circuit 50 is set to the H level. In this manner, the output signal at the H level indicates that operation of semiconductor switch SW2 with respect to control signal S is abnormal.

Timing circuit 54 is implemented by a counter, for example, and counts a time for which XOR circuit 50 outputs the signal at the H level. When the time for which XOR circuit 50 outputs the signal at the H level exceeds a predetermined time, timing circuit 54 outputs a signal having a value of "1". Thereby, when a state where the operation of semiconductor switch SW2 is abnormal continues for more than the predetermined time, timing circuit 54 outputs the signal having a value of "1".

On the other hand, when XOR circuit 50 outputs the signal at the L level, or when the time for which XOR circuit 50 outputs the signal at the H level is less than the predetermined time, timing circuit 54 outputs a signal having a value of "0". Thereby, when the operation of semiconductor switch SW2 is normal, or when the state where the operation of semiconductor switch SW2 is abnormal does not continue for the predetermined time, timing circuit 54 outputs the signal having a value of "0".

It should be noted that the predetermined time is set considering occurrence of deviation of timings at which gate drivers GD1 to GDn receive control signal S. For example, the predetermined time is set to more than or equal to a time taken for gate driver GD4 to receive control signal S transmitted from I/F circuit 34.

Flip-flop 58 receives the output signal of timing circuit 54 at a set(S), and receives the value "0" at a reset (R). When S=1 and R=0, an output (Q) is set to "1". When S=0 and R=0, the output (Q) maintains its state. That is, when the output signal of timing circuit 54 rises from an L level to an H level, flip-flop 58 holds an output state in the state of "1". An output signal of flip-flop 58 is inputted to NOT circuit 64 and OR circuit 62.

NOT circuit 64 inverts the output signal of flip-flop 58 and outputs it. For example, NOT circuit 64 outputs a signal having a value of "0" when it receives the signal having a value of "1", and outputs a signal having a value of "1" when it receives the signal having a value of "0".

Warning light A1 is turned on when it receives the signal having a value of "0" from NOT circuit 64. Warning light A1 is turned off when it receives the signal having a value of "1" from NOT circuit 64. That is, warning light A1 is turned on when the state where the operation of semiconductor switch SW2 is abnormal continues for more than the predetermined time. Warning light A1 corresponds to one embodiment of "a first notification member" for notifying the user that the operation of semiconductor switch SW2 with respect to control signal S provided to gate driver GD2 is abnormal.

AND circuit 74 receives output signal DET of determiner 42 at a first input terminal, and receives state detection signal DS3 from gate driver GD3 at a second input terminal. As described above, state detection signal DS3 is state detection signal DS generated in gate driver GD3, and is a signal indicating whether IGBTs Q3 to Qn included in semiconductor switches SW3 to SWn, respectively, are in the ON state or are in the OFF state. When all of IGBTs Q3 to Qn are in the ON state, state detection signal DS3 is set to the H level. When at least one of IGBTs Q3 to Qn is in the OFF state, state detection signal DS3 is set to the L level.

AND circuit 74 calculates a logical product of the two input signals, and outputs state detection signal DS2 indicating a calculation result. When both signal DET and state detection signal DS3 are at the H level, AND circuit 74 outputs state detection signal DS2 at the H level. When at least one of signal DET and state detection signal DS3 is at the L level, AND circuit 74 outputs state detection signal DS2 at the L level. Therefore, when all of IGBTs Q2 to Qn are in the ON state, state detection signal DS2 is set to the H level. On the other hand, when at least one of IGBTs Q2 to Qn is in the OFF state, state detection signal DS2 is set to the L level.

XOR circuit 52 receives control signal S at a first input terminal, and receives state detection signal DS2 at a second input terminal. XOR circuit 52 calculates an exclusive OR of the two input signals, and outputs a signal indicating a calculation result. When the value of control signal S matches the value of state detection signal DS2, XOR circuit 52 outputs a signal at an L level. When the value of control signal S does not match the value of state detection signal DS2, XOR circuit 52 outputs a signal at an H level.

Thereby, when both control signal S and state detection signal DS2 are at the H level, that is, when IGBTs Q2 to Qn are turned on normally in response to an ON command, the output signal of XOR circuit 52 is set to the L level. Alternatively, when both control signal S and state detection signal DS2 are at the L level, that is, when at least one of IGBTs Q2 to Qn is turned off in response to an OFF command, the output signal of XOR circuit 52 is set to the L level.

On the other hand, when control signal S is at the H level and state detection signal DS2 is at the L level, that is, when at least one of IGBTs Q2 to Qn is turned off in spite of an ON command, the output signal of XOR circuit 52 is set to the H level. Alternatively, when control signal S is at the L level and state detection signal DS2 is at the H level, that is, when all of IGBTs Q2 to Qn are turned on in spite of an OFF command, the output signal of XOR circuit 52 is set to the H level. In this manner, the output signal at the H level indicates that control signal S does not match operation of semiconductor switches SW2 to SWn.

Timing circuit 56 counts a time for which XOR circuit 52 outputs the signal at the H level. When the time for which XOR circuit 52 outputs the signal at the H level exceeds a predetermined time, timing circuit 56 outputs a signal having a value of “1”. Thereby, when a state where control signal S does not match the operation of semiconductor switches SW2 to SWn continues for more than the predetermined time, timing circuit 56 outputs the signal having a value of “1”.

On the other hand, when XOR circuit 52 outputs the signal at the L level, or when the time for which XOR circuit 52 outputs the signal at the HI level is less than the predetermined time, timing circuit 56 outputs a signal having a value of “0”. Thereby, when control signal S matches the operation of semiconductor switches SW2 to SWn, or when the state where control signal S does not match the operation of semiconductor switches SW2 to SWn does not continue for the predetermined time, timing circuit 56 outputs the signal having a value of “0”. The predetermined time is set considering occurrence of deviation of timings at which gate drivers GD1 to GDn receive control signal S.

Flip-flop 60 receives the output signal of timing circuit 56 at a set(S), and receives the value “0” at a reset (R). When S=1 and R=0, an output (Q) is set to “1”. When S=0 and R=0, the output (Q) maintains its state. That is, when the output signal of timing circuit 56 rises from an L level to an H level, flip-flop [58] 60 holds an output state in the state of “1”. An output signal of flip-flop 60 is inputted to NOT circuit 66 and OR circuit 62.

NOT circuit 66 inverts the output signal of flip-flop 60 and outputs it. Warning light A2 is turned on when it receives the signal having a value of “0” from NOT circuit 66. Warning light A2 is turned off when it receives the signal having a value of “1” from NOT circuit 66. That is, warning light A2 is turned on when the state where control signal S does not match the operation of semiconductor switches SW2 to SWn continues for more than the predetermined time. Warning light A2 corresponds to one embodiment of “a second notification member” for notifying the user about an abnormality that control signal S provided to gate driver GD2 does not match the operation of semiconductor switches SW2 to SWn.

OR circuit 62 receives the output signal of flip-flop 58 at a first input terminal, and receives the output signal of flip-flop 60 at a second input terminal. OR circuit 62 calculates a logical sum of the two input signals, and outputs a signal indicating a calculation result. When at least one of the output signal of flip-flop 58 and the output signal of flip-flop 60 is at an H level (that is, has a value of “1”), OR circuit 62 outputs a signal at an H level.

As described above, when the state where the operation of semiconductor switch SW2 with respect to control signal S is abnormal continues for more than the predetermined time, the output signal of flip-flop 58 is held at the H level in response to the output signal of timing circuit 54. Further, when the state where control signal S does not match the operation of semiconductor switches SW2 to SWn continues for more than the predetermined time, the output signal of flip-flop 60 is held at the H level in response to the output signal of timing circuit 56. Therefore, when the operation of semiconductor switch SW2 with respect to control signal S is abnormal, or when control signal S does not match the operation of semiconductor switches SW2 to SWn, the output signal of OR circuit 62 is set to the HI level, as it is determined that an abnormality occurs in semiconductor switch SW2.

NOT circuit 68 inverts abnormality detection signal DA3 inputted from gate driver GD3 and outputs it. As described above, abnormality detection signal DA3 is a signal indicating the presence or absence of an abnormality in semiconductor switches SW3 to SWn. When an abnormality occurs in at least one of semiconductor switches SW3 to SWn, abnormality detection signal DA3 is set to the L level. When no abnormality occurs in any of semiconductor switches SW3 to SWn, abnormality detection signal DA3 is set to the H level. NOT circuit 68 outputs a signal at an L level when it receives abnormality detection signal DA3 at the H level, and outputs a signal at an H level when it receives abnormality detection signal DA3 at the L level.

OR circuit 70 receives the output signal of NOT circuit 68 at a first input terminal, and receives the output signal of OR circuit 62 at a second input terminal. OR circuit 70 calculates a logical sum of the two input signals, and outputs a signal indicating a calculation result. When at least one of the output signal of OR circuit 62 and the output signal of NOT circuit 68 is at the H level, OR circuit 70 outputs a signal at an H level.

Thereby, when at least one of (i) a case where abnormality detection signal DA3 is at the L level, that is, a case where an abnormality occurs in semiconductor switches SW3 to SWn, and (ii) a case where an abnormality occurs in semiconductor switch SW2, is satisfied, the output signal of OR circuit 70 is set to the H level. On the other hand, when all of (iii) a case where abnormality detection signal DA3 is at the H level, that is, a case where semiconductor switches SW3 to SWn are normal, and (iv) a case where semiconductor switch SW2 is normal, are satisfied, the output signal of OR circuit 70 is set to an L level.

NOT circuit 72 inverts the output signal of OR circuit 70 and generates abnormality detection signal DA2. NOT circuit 72 outputs abnormality detection signal DA2 at the L level when it receives the signal at the H level from OR circuit 70, and outputs abnormality detection signal DA2 at the H level when it receives the signal at the L level from OR circuit 70. Abnormality detection signal DA2 at the L level indicates that at least one of the cases (i) and (ii) described above is satisfied and an abnormality occurs in at least one of semiconductor switches SW2 to SWn. Abnormality detection signal DA2 at the H level indicates that all of the cases (iii) and (iv) described above are satisfied and all of semiconductor switches SW2 to SWn are normal.

As described above, abnormality detection circuit 44 in gate driver GD2 is configured to turn on warning light A1 when it detects an abnormality of the operation of semiconductor switch SW2 with respect to control signal S provided to gate driver GD2. Further, abnormality detection circuit 44 is configured to turn on warning light A2 when it detects a mismatch between control signal S provided to gate driver GD2 and the operation of semiconductor switches SW2 to SWn.

Abnormality detection circuit 44 is further configured, in addition to turning on warning lights A1 and A2, to determine that an abnormality occurs in semiconductor switch SW2, and generate abnormality detection signal DA2 at the L level.

Further, abnormality detection circuit 44 is configured to output state detection signal DS2 at the H level when all of IGBTs Q2 to Qn are in the ON state, and to output state detection signal DS2 at the L level when at least one of IGBTs Q2 to Qn is in the OFF state.

As shown in FIG. 4, state detection signal DS2 is provided from output terminal OUT2 to input terminal IN2 of gate driver GD1 via optical fiber F2. Abnormality detection signal DA2 is provided from output terminal OUT3 to input terminal IN3 of gate driver GD1 via optical fiber F3. Although not shown, also in gate driver GD1, warning lights A1 and A2 are controlled and state detection signal DS1 and abnormality detection signal DA1 are generated, based on control signal S, signal DET, state detection signal DS2, and abnormality detection signal DA2, according to the same procedure. State detection signal DS1 is provided from output terminal OUT2 to state detection signal reception unit 342 of I/F circuit 34 via optical fiber F2. Abnormality detection signal DA1 is provided from output terminal OUT3 to abnormality detection signal reception unit 344 of I/F circuit 34 via optical fiber F3.

<Operation of Detecting Abnormality in Switch Circuit 14>

Next, operation of detecting an abnormality in switch circuit 14 by gate drivers GD1 to GDn shown in FIGS. 3 and 4 will be described. Gate drivers GD1 to GDn are configured such that they can detect three types of abnormalities described below.

(1) Failure of Driver 40 or IGBT Q

Figure 6:
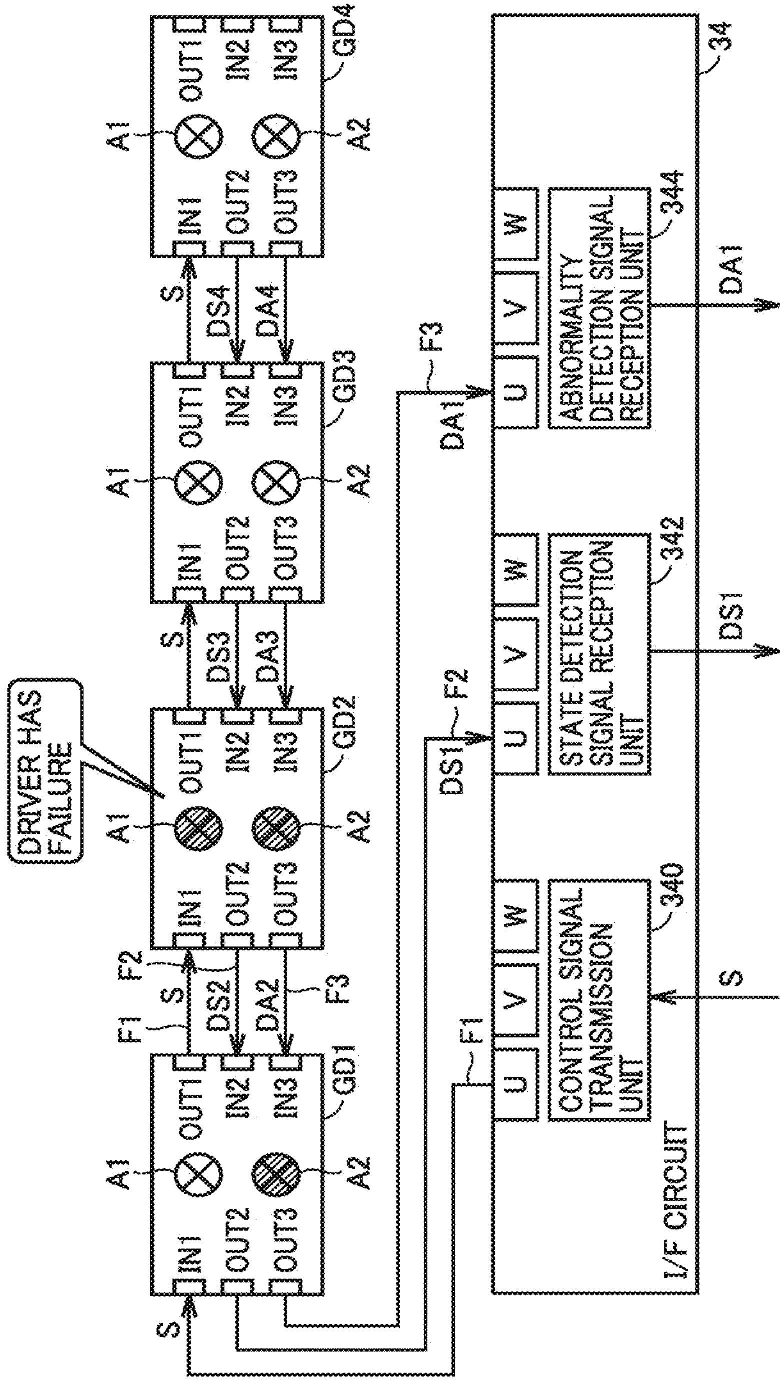
FIG. 6 is a view for illustrating a first example of abnormality detection operation of gate drivers.

First, abnormality detection operation when failure of driver 40 or IGBT Q occurs in any one of gate drivers GD1 to GDn will be described. FIG. 6 is a view for illustrating abnormality detection operation of gate drivers GD1 to GDn. FIG. 6 assumes a case where driver 40 of gate driver GD2 has a failure.

As shown in FIG. 4, gate driver GD2 receives control signal S from gate driver GD1 via optical fiber F1. Further, gate driver GD2 receives state detection signal DS3 and abnormality detection signal DA3 from gate driver GD3 via optical fibers F2 and F3.

In gate drivers GD3 to GDn, drivers 40 are normal, and turn on or off IGBTs Q3 to Qn included in semiconductor switches SW3 to SWn, respectively, in response to control signal S. Accordingly, when control signal S is at the H level, abnormality detection circuit 44 of gate driver GD2 receives state detection signal DS3 at the H level. Abnormality detection circuit 44 further receives abnormality detection signal DA3 at the H level.

Inside gate driver GD2, driver 40 generates gate signal G2 based on control signal S, and inputs it to the gate of IGBT Q2. However, when driver 40 has a failure and cannot generate gate signal G2 normally, there may occur a phenomenon in which IGBT Q2 is not turned on in spite of control signal S at the H level (an ON command), or a phenomenon in which IGBT Q2 is not turned off in spite of control signal S at the L level (an OFF command).

For example, when there occurs a phenomenon in which IGBT Q2 is not turned in spite of control signal S at the H level, abnormality detection circuit 44 determines that there occurs an abnormality of operation of semiconductor switch SW2 with respect to control signal S, in response to a state where the value of control signal S does not match the value of signal DET continuing for the predetermined time, as shown in FIG. 5. As a result, warning light A1 of gate driver GD2 is turned on.

Further, since IGBT Q2 of IGBTs Q2 to Qn is in the OFF state in spite of control signal S at the H level, abnormality detection circuit 44 generates state detection signal DS2 at the L level. Abnormality detection circuit 44 determines that there occurs a mismatch between control signal S and the operation of semiconductor switches SW2 to SWn, in response to a state where the value of control signal S does not match the value of state detection signal DS2 continuing for the predetermined time. As a result, warning light A2 of gate driver GD2 is turned on.

Furthermore, abnormality detection circuit 44 determines that an abnormality occurs in semiconductor switch SW2, and generates abnormality detection signal DA2 at the L level. State detection signal DS2 at the L level and abnormality detection signal DA2 at the L level are provided, via optical fibers F2 and F3, respectively, to abnormality detection circuit 44 of gate driver GD1.

Inside gate driver GD1, driver 40 is normal, and thus IGBT Q1 of semiconductor switch SW1 is turned on in response to control signal S at the H level. Since the value of control signal S matches the value of signal DET, abnormality detection circuit 44 determines that semiconductor switch SW1 is normal. As a result, warning light A1 is set to a turned-off state.

On the other hand, abnormality detection circuit 44 generates state detection signal DS1 at the L level based on state detection signal DS2 at the L level and signal DET at the H level. State detection signal DS1 at the L level indicates that at least one of IGBTs Q1 to Qn is in the OFF state. Then, in response to a state where the value of control signal S does not match the value of state detection signal DS1 continuing for the predetermined time, abnormality detection circuit 44 determines that there occurs a mismatch between control signal S and operation of semiconductor switches SW1 to SWn. As a result, warning light A2 of gate driver GD1 is turned on.

Furthermore, it is determined that an abnormality occurs in semiconductor switch SW1, and a signal at the II level is provided to OR circuit 70. OR circuit 70 is further provided with abnormality detection signal DA2 at the H level from gate driver GD2 via NOT circuit 68. Abnormality detection circuit 44 determines that an abnormality occurs in semiconductor switches SW1 to SWn, and generates abnormality detection signal DA1 at the L level. State detection signal DS1 at the L level and abnormality detection signal DA1 at the L level are provided, via optical fibers F2 and F3, respectively, to I/F circuit 34.

Through the operation described above, when driver 40 of gate driver GD2 has a failure, warning lights A1 and A2 provided in gate driver GD2 are turned on, and warning light A2 provided in gate driver GD1 is turned on.

Since warning light A1 of gate driver GD2 is turned on, the user can detect that there occurs an abnormality of operation of semiconductor switch SW2 with respect to control signal S. Further, since warning light A2 of gate driver GD2 is turned on, the user can detect that there occurs a mismatch between control signal S and the operation of semiconductor switches SW2 to SWn due to the abnormality of operation of semiconductor switch SW2.

Further, since only warning light A2 is turned on in gate driver GD1, the user can detect that semiconductor switch SW1 is normal, and that there occurs a mismatch between control signal S and the operation of semiconductor switches SW1 to SWn due to the abnormality of operation of semiconductor switch SW2.

(2) Damage to Optical Fiber F1 (Abnormality of Communication of Control Signal S)

Figure 7:
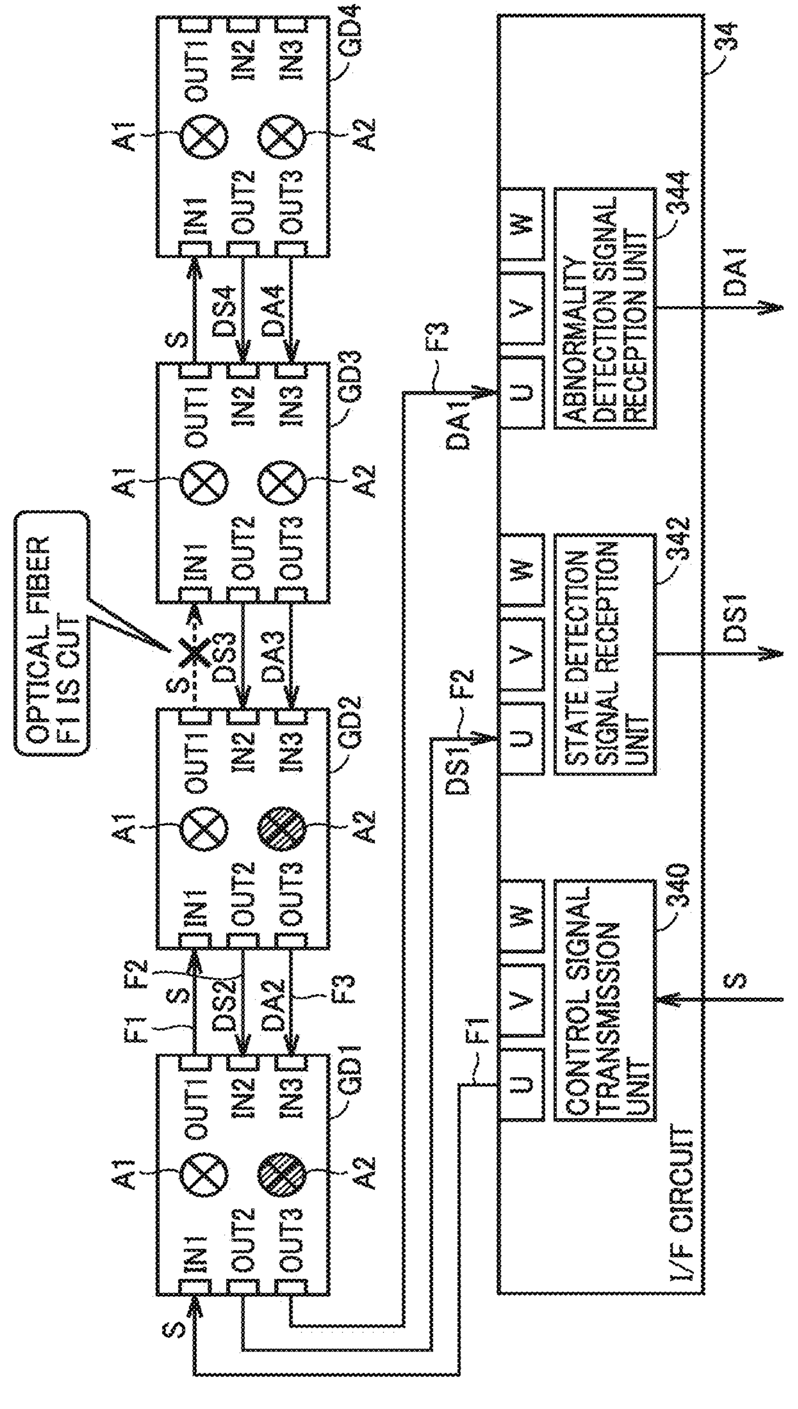
FIG. 7 is a view for illustrating a second example of the abnormality detection operation of the gate drivers.

Next, abnormality detection operation when an abnormality of communication of control signal S occurs due to a damage to optical fiber F1 will be described. FIG. 7 is a view for illustrating abnormality detection operation of gate drivers GD1 to GDn. FIG. 7 assumes a case where optical fiber F1 connecting gate driver GD2 and gate driver GD3 is cut.

When optical fiber F1 between gate drivers GD2 and GD3 is cut, control signal S cannot be transmitted from gate driver GD2 to gate driver GD3, and thus gate drivers GD3 to GDn cannot receive control signal S. Accordingly, when control signal S at the H level (an ON command) is outputted from I/F circuit 34, the ON command is provided to gate drivers GD1 and GD2, whereas the ON command is not provided to gate drivers GD3 to GDn.

In this case, gate drivers GD1 and GD2 turn on IGBTs Q1 and Q2 of semiconductor switches SW1 and SW2, respectively, in response to control signal S at the H level. On the other hand, gate drivers GD3 to GDn maintain IGBTs Q3 to Qn of semiconductor switches SW3 to SWn, respectively, in the OFF state, in response to control signal S at the L level.

In this manner, IGBTs Q1 to Qn of semiconductor switches SW1 to SWn operate normally in response to provided control signal S. Therefore, warning lights A1 are in the turned-off state in all of gate drivers GD1 to GDn.

Inside gate driver GD2, abnormality detection circuit 44 generates state detection signal DS2 at the L level, according to state detection signal DS3 at the L level from gate driver GD3. Then, abnormality detection circuit 44 determines that there occurs a mismatch between control signal S and the operation of semiconductor switches SW2 to SWn, in response to the state where the value of control signal S does not match the value of state detection signal DS2 continuing for the predetermined time. As a result, warning light A2 of gate driver GD2 is turned on.

Furthermore, in addition to turning on warning light A2, abnormality detection circuit 44 determines that an abnormality occurs in semiconductor switch SW2, and generates abnormality detection signal DA2 at the L level. State detection signal DS2 at the L level and abnormality detection signal DA2 at the L level are provided, via optical fibers F2 and F3, respectively, to abnormality detection circuit 44 of gate driver GD1.

Inside gate driver GD1, abnormality detection circuit 44 generates state detection signal DS1 at the L level, according to state detection signal DS2 at the L level. State detection signal DS1 at the L level indicates that at least one of IGBTs Q1 to Qn is in the OFF state. Then, abnormality detection circuit 44 determines that there occurs a mismatch between control signal S and the operation of semiconductor switches SW1 to SWn, in response to the state where the value of control signal S does not match the value of state detection signal DS1 continuing for the predetermined time. As a result, warning light A2 of gate driver GD1 is turned on.

Furthermore, in addition to turning on warning light A2, abnormality detection circuit 44 determines that an abnormality occurs in semiconductor switch SW1, and generates abnormality detection signal DA1 at the L level. State detection signal DS1 at the L level and abnormality detection signal DA1 at the L level are provided, via optical fibers F2 and F3, respectively, to I/F circuit 34.

Through the operation described above, when optical fiber F1 between gate drivers GD2 and GD3 is damaged, warning lights A1 of all of gate drivers GD1 to GDn are set to the turned-off state. Thereby, the user can detect that IGBTs Q operate normally with respect to control signal S in all of semiconductor switches SW1 to SWn. That is, the user can determine that driver 40 of each gate driver GD and IGBT Q of each semiconductor switch SW do not have a failure.

Further, since warning lights A2 of gate drivers GD1 and GD2 are turned on whereas warning lights A2 of gate drivers GD3 and GD4 are turned off, the user can detect that there occurs a mismatch of operation between semiconductor switches SW1, SW2 and semiconductor switches SW3, SW4. Then, the user can estimate that this mismatch of operation may be caused by an abnormality of communication between gate driver GD2 and gate driver GD3.

(3) Abnormality of Optical Fiber F2 (Abnormality of Communication of State Detection Signal DS)

Figure 8:
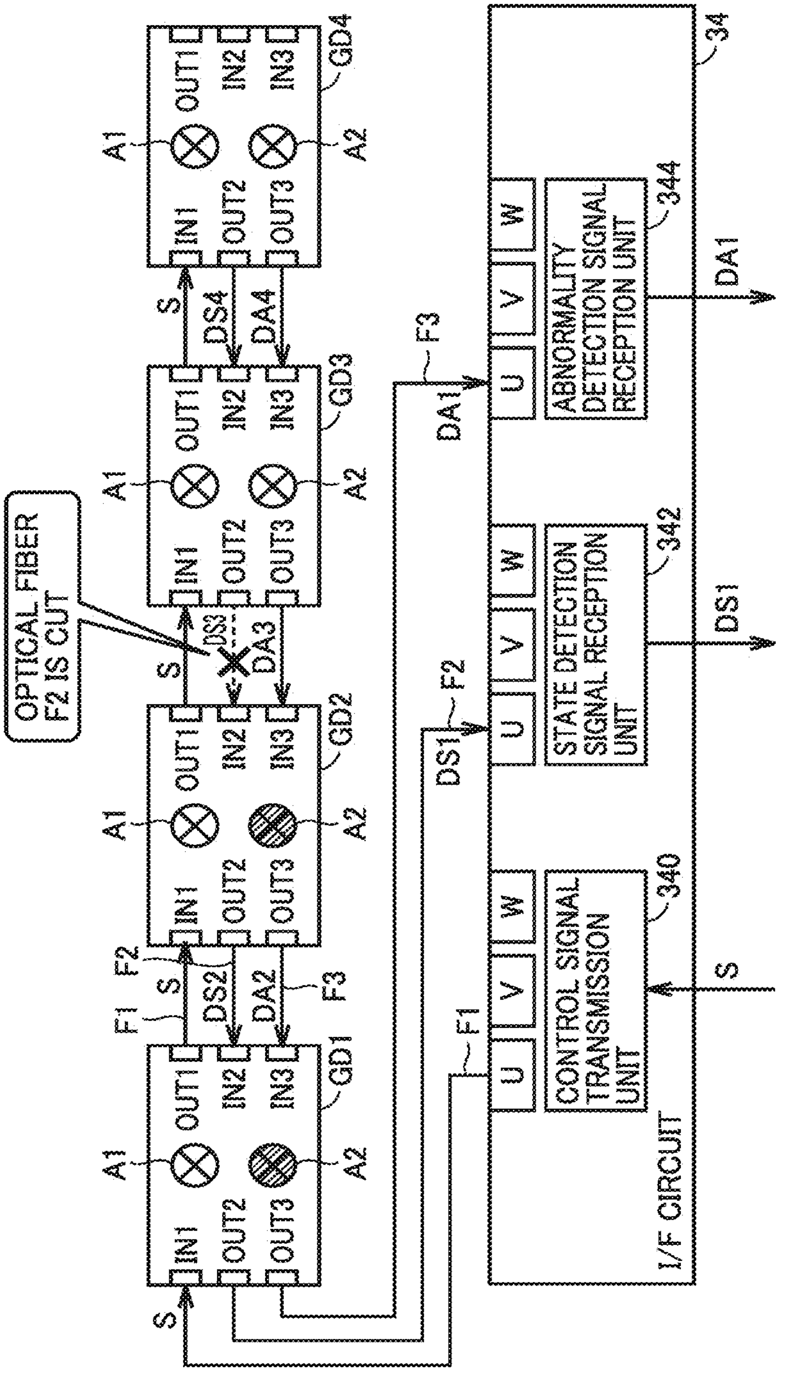
FIG. 8 is a view for illustrating a third example of the abnormality detection operation of the gate drivers.

Next, abnormality detection operation when an abnormality of communication of state detection signal DS occurs due to a damage to optical fiber F2 will be described. FIG. 8 is a view for illustrating abnormality detection operation of gate drivers GD1 to GDn. FIG. 8 assumes a case where optical fiber F2 connecting gate driver GD2 and gate driver GD3 is cut.

When optical fiber F2 between gate drivers GD2 and GD3 is cut, state detection signal DS3 cannot be transmitted from gate driver GD3 to gate driver GD2. Accordingly, gate driver GD2 cannot generate state detection signal DS2 using state detection signal DS3.

When control signal S at the H level (an ON command) is outputted from I/F circuit 34, gate drivers GD1 to GDn turn on IGBTs Q1 to Qn included in semiconductor switches SW1 to SWn, respectively, in response to control signal S at the H level. In this manner, IGBTs Q1 to Qn operate normally in response to provided control signal S, and thus warning lights A1 are in the turned-off state in all of gate drivers GD1 to GDn.

However, inside gate driver GD2, state detection signal DS3 at the H level cannot be received from gate driver GD3 via optical fiber F2. Accordingly, abnormality detection circuit 44 generates state detection signal DS2 at the L level, according to state detection signal DS3 at the L level. Then, abnormality detection circuit 44 determines that there occurs a mismatch between control signal S and the operation of semiconductor switches SW2 to SWn, in response to the state where the value of control signal S does not match the value of state detection signal DS2 continuing for the predetermined time. As a result, warning light A2 of gate driver GD2 is turned on.

Furthermore, in addition to turning on warning light A2, abnormality detection circuit 44 determines that an abnormality occurs in semiconductor switch SW2, and generates abnormality detection signal DA2 at the L level. State detection signal DS2 at the L level and abnormality detection signal DA2 at the L level are provided, via optical fibers F2 and F3, respectively, to abnormality detection circuit 44 of gate driver GD1.

Inside gate driver GD1, abnormality detection circuit 44 generates state detection signal DS1 at the L level, according to state detection signal DS2 at the L level. State detection signal DS1 at the L level indicates that at least one of IGBTs Q1 to Qn is in the OFF state. Then, abnormality detection circuit 44 determines that there occurs a mismatch between control signal S and the operation of semiconductor switches SW1 to SWn, in response to the state where the value of control signal S does not match the value of state detection signal DS1 continuing for the predetermined time. As a result, warning light A2 of gate driver GD1 is turned on.

Furthermore, in addition to turning on warning light A2, abnormality detection circuit 44 determines that an abnormality occurs in semiconductor switch SW1, and generates abnormality detection signal DA1 at the L level. State detection signal DS1 at the L level and abnormality detection signal DA1 at the L level are provided, via optical fibers F2 and F3, respectively, to I/F circuit 34.

Through the operation described above, when optical fiber F2 between gate drivers GD2 and GD3 is damaged, warning lights A1 of all of gate drivers GD1 to GDn are set to the turned-off state. Thereby, the user can detect that IGBTs Q operate normally with respect to control signal S in all of semiconductor switches SW1 to SWn. That is, the user can determine that driver 40 of each gate driver GD and IGBT Q of each semiconductor switch SW do not have a failure.

Further, since warning lights A2 of gate drivers GD1 and GD2 are turned on whereas warning lights A2 of gate drivers GD3 and GD4 are turned off, the user can detect that there occurs a mismatch of operation between semiconductor switches SW1, SW2 and semiconductor switches SW3, SW4. Then, the user can estimate that this mismatch of operation may be caused by an abnormality of communication between gate driver GD2 and gate driver GD3.

<Function and Effect>

The function and effect of power supply device 10 in accordance with the present embodiment will be described below, in comparison with a power supply device in accordance with a comparative example.

Figure 9:
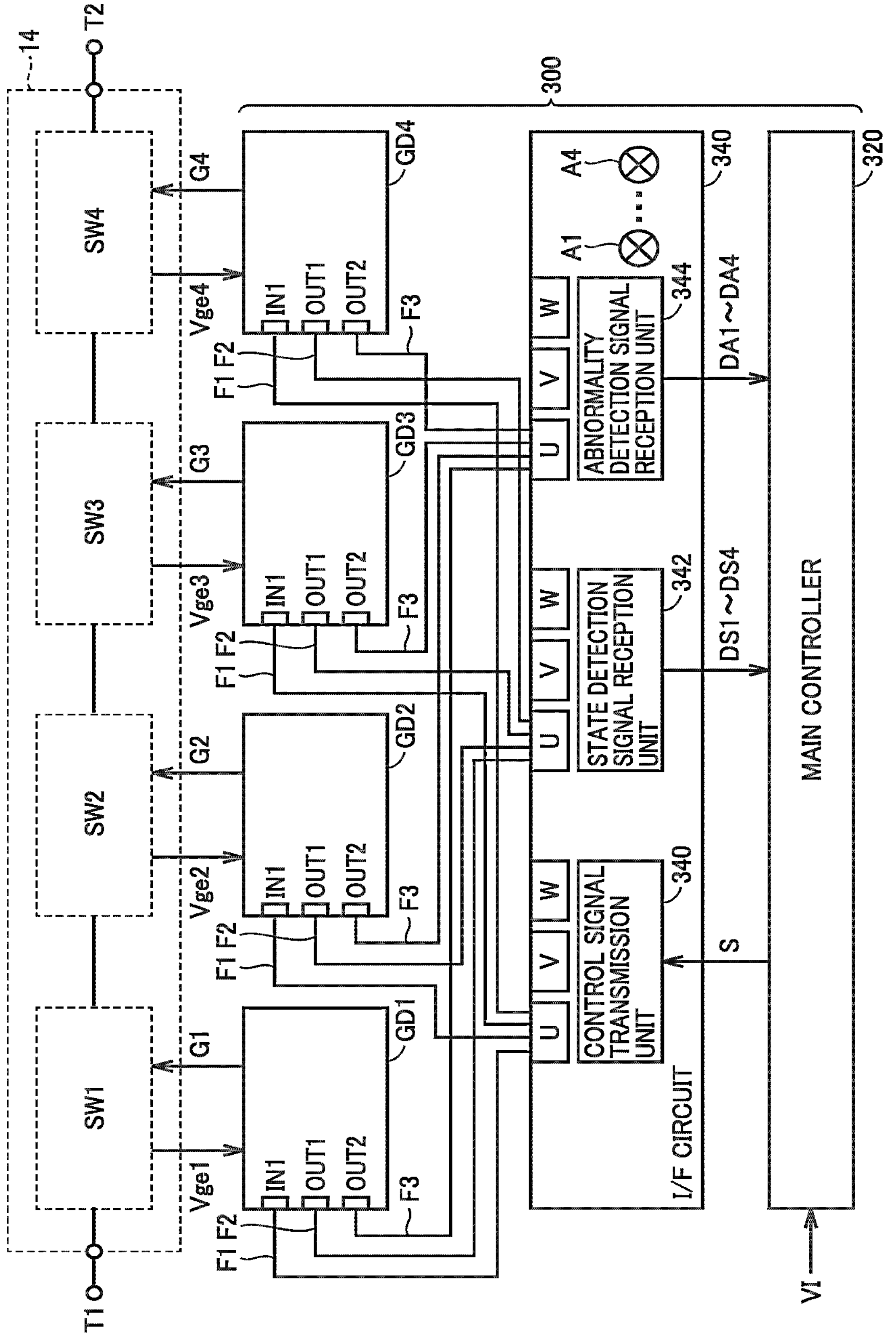
FIG. 9 is a view showing a schematic configuration of a power supply device in accordance with a comparative example.

FIG. 9 is a view showing a schematic configuration of a power supply device in accordance with a comparative example. FIG. 9 shows a configuration of a portion related to control of switch circuit 14, of a control device 300 included in the power supply device in accordance with the comparative example. It should be noted that FIG. 9 shows only a portion related to one-phase (U-phase) AC power.

As shown in FIG. 9, in the power supply device in accordance with the comparative example, control device 300 includes a main controller 320, an I/F circuit 330, n gate drivers GD1 to GDn, and optical fibers F1 to F3. Control device 300 is different from control device 30 shown in FIG. 3 in the configuration of gate drivers GD and wiring of optical fibers F1 to F3.

In control device 300, optical fibers F1 to F3 are provided between each of gate drivers GD1 to GDn and I/F circuit 330. That is, gate drivers GD1 to GDn are connected in parallel with one another with respect to I/F circuit 330, in contrast to FIG. 3.

In the comparative example, each of gate drivers GD1 to GDn can directly exchange the signals with I/F circuit 330, and thereby delay of the signals is suppressed, when compared with the present embodiment. On the other hand, since optical fibers F1 to F3 reaching several meters are connected to all of gate drivers GD1 to GDn, there is a concern that wiring may become complicated as number n of semiconductor switches SW increases.

Further, in the comparative example, from each gate driver GD, state detection signal DS indicating the ON/OFF state of corresponding semiconductor switch SW is inputted to I/F circuit 330. Accordingly, I/F circuit 330 can detect an abnormality of operation of semiconductor switch SW with respect to control signal S, by comparing control signal S with state detection signal DS for each gate driver GD. Then, by turning on a warning light A corresponding to semiconductor switch SW whose operation is abnormal, of warning lights A1 to An provided corresponding to semiconductor switches SW1 to SWn, respectively, the user can be notified about which semiconductor switch SW has an abnormality.

However, in the comparative example, there is a problem that, when an abnormality of operation of semiconductor switch SW is detected, it is impossible to distinguish whether the abnormality of operation is due to a failure of gate driver GD or IGBT Q, or due to a damage to the optical fibers transmitting control signal S and state detection signal DS.

In contrast, in the present embodiment, the wiring length of optical fibers F1 to F3 connected to gate drivers GD2 to GDn can be shortened, by connecting gate drivers GD1 to GDn in series with respect to I/F circuit 34, as shown in FIG. 3. Therefore, this can suppress wiring from becoming complicated due to an increase in number n of semiconductor switches SW.

Further, in the present embodiment, each gate driver GD is provided with warning light A1 for notifying that operation of semiconductor switch SW with respect to provided control signal S is abnormal (the first notification member), and warning light A2 for notifying an abnormality that provided control signal S does not match operation of a plurality of semiconductor switches SW including that semiconductor switch SW (the second notification member). Thereby, based on the states of warning lights A1 and A2 in each gate driver GD, the user can distinguish whether the abnormality of semiconductor switch SW is due to a failure of gate driver GD or IGBT Q (see FIG. 6), or due to a damage to the optical fibers (see FIGS. 7 and 8). Further, based on the states of warning lights A1 and A2 in each gate driver GD, the user can specify the site where the failure occurs.

As a result, according to power supply device 10 in accordance with the present embodiment, it is possible to specify the content and the site of occurrence of an abnormality that occurs in a power supply device including a plurality of semiconductor switches connected in series, without complicating the configuration of the device.

It should be understood that the embodiment disclosed herein is illustrative and non-restrictive in every respect. The present disclosure is defined by the scope of the claims, rather than the description above, and is intended to include any modifications within the scope and meaning equivalent to the scope of the claims.

REFERENCE SIGNS LIST

1: AC power supply; 2: load; 3: battery; 14: switch circuit; 14*a*: input node; 14*b*: output node; 16: bidirectional converter; 18, 20: voltage detector; 30, 300: control device; 32, 320: main controller; 34, 330: I/F circuit; 30H: high-voltage component; 30L: low-voltage component; 40: driver; 42: determiner; 44: abnormality detection circuit; 54, 56: timing circuit; 58, 60: flip-flop; 340: control signal transmission unit; 342: state detection signal reception unit; 344: abnormality detection signal reception unit; T1, IN1 to IN3: input terminal; T2, OUT1 to OUT3: output terminal; T3: DC terminal; F1 to F3: optical fiber; A1, A2, An: warning light; G1 to Gn: gate signal; GD, GD1 to GDn: gate driver; Q1 to Qn, QA, QB: IGBT; D1 to Dn, DA, DB: diode; SN, SN1 to SNn: snubber circuit; Z, Z1 to Zn: varistor; SW, SW1 to SWn: semiconductor switch; S: control signal; DS, DS1 to DSn: state detection signal; DA, DA1 to DAn: abnormality detection signal.

The invention claimed is:

1. A power supply device comprising, when n is an integer more than or equal to 3 and i is an integer that is more than or equal to 2:

first to n-th semiconductor switches connected in series between first and second terminals;

first to n-th drive circuits that are provided corresponding to the first to n-th semiconductor switches, respectively, and drive the corresponding semiconductor switches in response to a control signal;

an interface circuit that transmits and receives signals to and from the first to n-th drive circuits; and first and second communication lines that connect the interface circuit and the first to n-th drive circuits in series, wherein the first communication line is configured to sequentially transmit the control signal from the interface circuit to the n-th drive circuit via the first drive circuit, the second communication line is configured to sequentially transmit a state detection signal indicating an operation state of the semiconductor switches, from the n-th drive circuit to the interface circuit via the first drive circuit, an i-th drive circuit includes a driver that drives an i-th semiconductor switch in response to the control signal received from an (i−1)-th drive circuit, an abnormality detection circuit for detecting an abnormality of the i-th semiconductor switch, and first and second notification members, and the abnormality detection circuit detects the abnormality of the i-th semiconductor switch based on the control signal and an operation state of the i-th semiconductor switch, and notifies a detection result using the first notification member, generates the state detection signal indicating an operation state of the i-th to n-th semiconductor switches based on the operation state of the i-th semiconductor switch and the state detection signal indicating an operation state of (i+1)-th to the n-th semiconductor switches received from an (i+1)-th drive circuit, and detects a mismatch between the control signal and the operation state of the i-th to n-th semiconductor switches based on the control signal and the generated state detection signal, and notifies a detection result using the second notification member.

2. The power supply device according to claim 1, further comprising a third communication line that connects the interface circuit and the first to n-th drive circuits in series, wherein the third communication line is configured to sequentially transmit an abnormality detection signal indicating presence or absence of an abnormality in the semiconductor switches, from the n-th drive circuit to the interface circuit via the first drive circuit, and in the i-th drive circuit, the abnormality detection circuit generates the state detection signal indicating an abnormality of the i-th to n-th semiconductor switches, when at least one of the abnormality of the i-th semiconductor switch and the mismatch between the control signal and the operation state of the i-th to n-th semiconductor switches is detected, or when the abnormality detection circuit receives the abnormality detection signal indicating an abnormality of the (i+1)-th to n-th semiconductor switches from the (i+1)-th drive circuit.

3. The power supply device according to claim 1, wherein the abnormality detection circuit detects the abnormality of the i-th semiconductor switch, when a state where the i-th semiconductor switch does not operate normally in response to the control signal continues for a first predetermined time, and detects the mismatch between the control signal and the operation state of the i-th to n-th semiconductor switches, when a state where a value of the control signal does not match a value of the state detection signal continues for a second predetermined time.

4. The power supply device according to claim 1, wherein each of the first to n-th semiconductor switches includes a semiconductor switching element having a main electrode and a control electrode, and in the i-th drive circuit, the driver inputs a drive signal according to the control signal to the control electrode of the semiconductor switching element, and the abnormality detection circuit detects the operation state of the i-th semiconductor switch based on a voltage between the control electrode and the main electrode.

5. The power supply device according to claim 2, wherein each of the first to third communication lines is an optical fiber.

6. The power supply device according to claim 1, wherein each of the first and second notification members is a warning light.

7. The power supply device according to claim 1, wherein the first terminal receives AC power supplied from an AC power supply, the second terminal is connected to a load driven by the AC power, and in a first case where an AC voltage is supplied normally from the AC power supply, the interface circuit generates the control signal for turning on the first to n-th semiconductor switches and outputs the control signal to the first communication line, and in a second case where the AC voltage is not supplied normally from the AC power supply, the interface circuit generates the control signal for turning off the first to n-th semiconductor switches and outputs the control signal to the first communication line.

8. The power supply device according to claim 7, further comprising a bidirectional converter connected to the second terminal, wherein in the first case, the bidirectional converter converts the AC power supplied from the AC power supply via the first to n-th semiconductor switches into DC power and stores the DC power in a power storage device, and in the second case, the bidirectional converter converts the DC power in the power storage device into AC power and supplies the AC power to the load.

9. The power supply device according to claim 2, wherein the abnormality detection circuit detects the abnormality of the i-th semiconductor switch, when a state where the i-th semiconductor switch does not operate normally in response to the control signal continues for a first predetermined time, and detects the mismatch between the control signal and the operation state of the i-th to n-th semiconductor switches, when a state where a value of the control signal does not match a value of the state detection signal continues for a second predetermined time.

* * * * *